United States Patent
Xu et al.

(10) Patent No.: US 7,437,464 B1
(45) Date of Patent: Oct. 14, 2008

(54) SYSTEMS AND METHODS FOR PROVIDING ASYNCHRONOUS MESSAGING

(75) Inventors: Jian Xu, Herndon, VA (US); Chung-Wen Yuan, North Potomac, MD (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 876 days.

(21) Appl. No.: 10/355,264

(22) Filed: Jan. 31, 2003

Related U.S. Application Data (60) Provisional application No. 60/358,349, filed on Feb. 22, 2002.

(51) Int. Cl.
*G06F 15/16* (2006.01)
(52) U.S. Cl. .................. 709/227; 709/228; 709/229
(58) Field of Classification Search .................. 709/227
See application file for complete search history.

(56) References Cited

U.S. PATENT DOCUMENTS

2002/0026464 A1* 2/2002 Jones et al. ................. 708/200
2003/0023957 A1* 1/2003 Bau et al. ................... 717/140
2003/0118353 A1* 6/2003 Baller et al. ................. 399/8
2004/0064351 A1* 4/2004 Mikurak ..................... 705/7

* cited by examiner

*Primary Examiner*—John Follansbee
*Assistant Examiner*—Glenford Madamba
(74) *Attorney, Agent, or Firm*—Finnegan Henderson Farabow, Garrett & Dunner, LLP (57) ABSTRACT

Systems and methods are provided for providing asynchronous communication between a source processor and a destination processor. In one embodiment, a method includes receiving an information request; making a first call to the destination processor, such that the first call includes the information request; and ending the first call while the destination processor determines an information response, such that said ending terminates a synchronous communication between the source processor and the destination processor. Furthermore, the method includes making a second call to the source processor, such that the second call includes the information response; ending the second call, such that said ending terminates a synchronous communication between the destination processor and the source processor; and providing asynchronously the information response.

32 Claims, 6 Drawing Sheets

SYSTEMS AND METHODS FOR PROVIDING ASYNCHRONOUS MESSAGING

CROSS REFERENCE TO RELATED APPLICATION

This application claims the benefit of U.S. Provisional Patent Application No. 60/358,349, entitled "SYSTEMS AND METHODS FOR PROVIDING AN ASYNCHRONOUS MESSAGING INTERFACE," filed on Feb. 22, 2002, the disclosure of which is expressly incorporated herein by reference in its entirety.

BACKGROUND OF THE INVENTION

I. Field of the Invention

The present invention generally relates to communications. More particularly, the invention relates to systems and methods for providing asynchronous messaging.

II. Background Information

Interprocessor communications frequently use communication mechanisms that enable the transport of information, such as the transport of packets using a protocol. One such interprocessor communication protocol is RPC (Remote Procedure Call).

RPC works with other protocols, such as Hyper Text Transfer Protocol (HTTP), Transmission Control Protocol/Internet Protocol (TCP/IP), or User Datagram Protocol (UDP), to carry information between communicating processors (or programs). The RPC protocol functions in a manner that is similar to a local procedure call. Like a local procedure call, the caller (or calling processor) places arguments in a procedure at a remote location (or destination processor), such as a results register. Then, the caller transfers control to the procedure. The RPC caller eventually regains control, receives the results of the procedure, and continues execution.

RPC works synchronously by having one thread of control wind logically through two processes: the source process and the destination process. When a call, such as RPC, is synchronous, the call is serial such that one call is processed before another. In addition, a synchronous call usually remains open (i.e., a caller waits and maintains an open connection for the response) while the destination processes that request. For example, the caller sends a call message to a remote procedure at a destination. The call message includes the parameters required to execute the procedure. The caller then waits for the destination's reply message with a result.

In communications environments where a connection is used, such as an HTTP connection, the connection may be kept open while the caller waits for a reply. Next, a process at the destination, which is dormant until the arrival of the call message, extracts the procedure parameters, computes the result, and sends a reply message to the caller. The caller (i.e., a process at the source processor) receives the reply message from the destination, extracts the results of the procedure, and the caller resumes execution with the results.

Recently, another interprocessor communication named SOAP (Simple Object Access Protocol) has been developed as an easy to implement protocol for exchanging information (messaging). SOAP is designed to operate seamlessly with RPC and operates well with HTTP. To exchange messages, SOAP implements an RPC that synchronously makes calls as described above. Making a remote procedure call with SOAP involves first building a SOAP message. The SOAP request message that is sent to a destination represents a synchronous call. The payload of that request message contains information (e.g., parameters and input data) to enable the destination processor to determine a subsequent SOAP response message with the result.

However, there are problems with using the synchronous RPC mechanisms in SOAP when a large number of calls are processed. One of the problems occurs due to the delay associated with processing each call. The delay creates a queue of calls waiting to be processed. In addition, while the calls are waiting in the queue, connection resources, such as HTTP connections, are open (occupied), preventing other calls from using the connections.

SUMMARY OF THE INVENTION

Accordingly, the present invention is directed to systems and methods for providing asynchronous messaging.

Systems and methods consistent with the systems and methods of the present invention may provide asynchronous communication between a source processor and a destination processor. Moreover, systems and methods consistent with the present invention may receive, at the source processor, an information request. Further, systems and methods consistent with the present invention may make, at the source processor, a first call to the destination processor, such that the first call includes the information request. In addition, systems and methods consistent with the present invention may end the first call while the destination processor determines an information response, such that ending terminates a synchronous communication between the source processor and the destination processor. Furthermore, systems and methods consistent with the present invention may make, at the destination processor, a second call to the source processor, such that the second call includes the information response. Systems and methods consistent with the present invention may also end the second call, such that ending terminates a synchronous communication between the destination processor and the source processor. Additionally, systems and methods consistent with the present invention may provide asynchronously the information response.

Additional features and advantages of the invention will be set forth in part in the description which follows and in part will be obvious from the description, or may be learned by practice of the invention. The objectives and advantages of the invention may be realized and attained by the system and method particularly described in the written description and claims hereof as well as the appended drawings.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. Wherever possible, the same reference numbers will be used throughout the drawings to refer to the same or like parts.

Figure 1A:
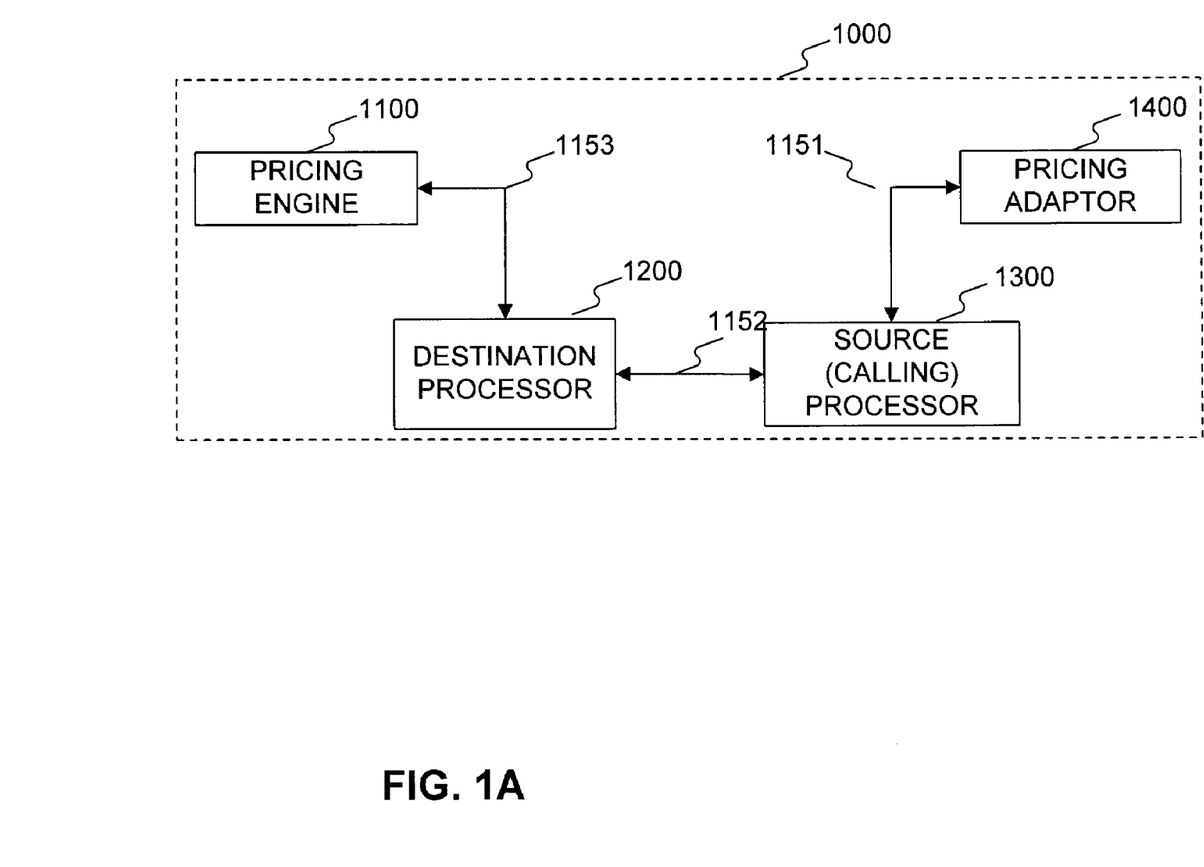
FIG. 1A illustrates an exemplary system environment consistent with the systems and methods of the present invention.

Systems and methods consistent with the present invention provide asynchronous messaging. FIG. 1A shows an exemplary system 1000 for providing asynchronous communications through a synchronous communication mechanism.

Referring to FIG. 1A, the system 1000 includes a pricing adaptor 1400, a source processor 1300, a destination processor 1200, a pricing engine 1100, and one or more communication channels 1151-1153.

In one embodiment, when an application (e.g., a server application) requests price information, the application uses the pricing adaptor 1400 to interface to a communication mechanism (or protocol) through which the price information is obtained. The pricing adaptor 1400 sends the price request to a source processor 1300 through communication channel 1151. The source processor 1300 receives the price request, processes the price request, and makes a first call through communication channel 1152 to the destination processor 1200. The destination processor 1200 receives the price request and ends the first call by sending a temporary response to the source processor 1300 through the communication channel 1152. By sending the temporary response, the first call ends, releasing that first call and its corresponding connection(s) through communication channel 1152. When the first call ends, other calls can utilize that connection. Unlike past approaches where a call would occupy a connection until the destination processor 1200 provides a response in the form of a price result to the source processor 1300 (i.e., a synchronous call and its corresponding response), systems and methods consistent with an embodiment of the present invention close (or terminate) the first call while the destination processor processes the price request, thus freeing the connection for other price requests.

The destination processor 1200 processes the price request received from the source processor 1300 and sends the price request to the pricing engine 1100. For example, in one embodiment, the pricing engine 1100 determines a price result for property, such as a residential property. When the pricing engine 1100 calculates the price result, the destination processor 1200 makes a second call to the source processor 1300 with the determined price. The source processor 1300 receives the price result and then sends a response to end the second call, so that the connection occupied by the second call is open to other price requests. The source processor 1300 then sends the price result (received from the destination processor 1200) to the pricing adaptor 1400. The pricing adaptor 1400 then sends the price to the application that originated the price request.

The pricing adaptor 1400 may include one or more processors that are capable of interfacing with the source processor 1300 and one or more higher layer applications (also referred to herein as applications or service applications). For example, the service application (not shown) may process mortgage loans. While processing mortgages, the service application may seek a price from a remote application that provides pricing information. When that is the case, the pricing adaptor 1400 may include a local procedure for the service application, which makes a call to that procedure requesting a price. The pricing adaptor 1400 may then format the price request before sending the price request to the pricing engine 1100 through the source processor 1300, destination processor 1200, and communication channels 1151-1153.

In the embodiment depicted in FIG. 1A, the pricing adaptor 1400 may include an application-programming interface that permits price requests on residential real estate (homes) to be made by a service application. For example, the pricing adaptor 1400 may request from the pricing engine 1100 (described in additional detail below) the price of one or more residential properties (homes). When a request is made by the service application, the pricing adaptor 1400 receives the price request from the service application and adapts that price request so that it is compatible with the application-programming interface. The pricing adaptor 1400 may adapt the price request by, for example, determining an XML (eXtensible Markup Language) message with a corresponding procedure call and parameters for that procedure.

The pricing engine 1100 may include one or more processors that are capable of interfacing with the destination processor 1200 and one or more service applications. For example, the service application (not shown) interfacing with the pricing engine 1100 may include an application (or processor) that determines residential property prices based on, among other things, street address. The pricing engine 1100 may include an application-programming interface that enables a processor, such as the destination processor 1200, to make price requests and receive a price result.

Communication channels 1151-1153 may include, alone or in any suitable combination a telephony-based network, a local area network (LAN), a wide area network (WAN), a dedicated intranet, the Internet, a wireless network, or a bus. Further, any suitable combination of wired and/or wireless components and systems may be incorporated into the communication channels. Although the communication channels are depicted in FIG. 1A as bi-directional, a skilled artisan would recognize that unidirectional communication links may be used instead.

Figure 1B:
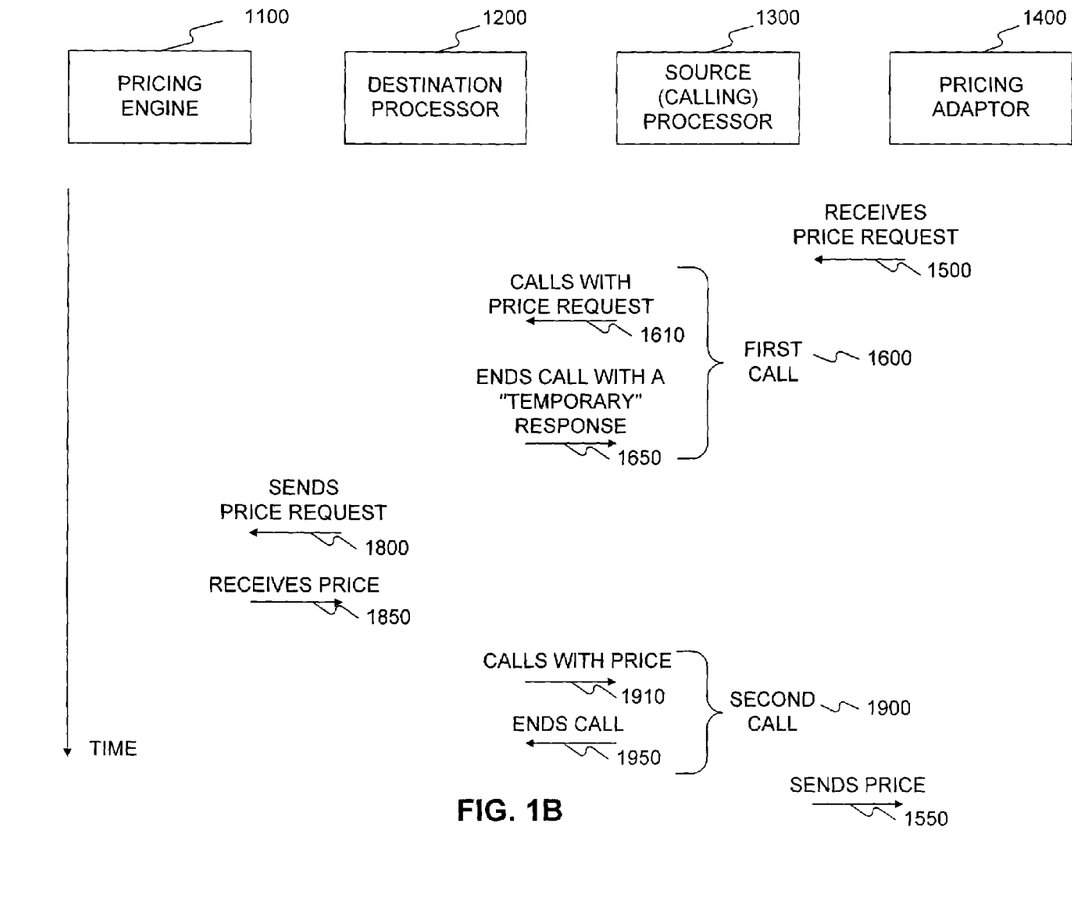
FIG. 1B illustrates the exemplary system environment of FIG. 1A with an exemplary message sequence consistent with the systems and methods of the present invention.

FIG. 1B shows an exemplary sequence of messages 1500-1950 for the pricing adaptor 1400, the source processor 1300, the destination processor 1200, and the pricing engine 1100. Referring to FIG. 1B, the source processor 1300 receives a price request 1500 and makes a first call 1600 by sending a price request 1610 to the destination processor. The destination processor terminates that call by sending a temporary response 1650 to the source processor 1300. Instead of keeping the first call open, as would be the case with a synchronous call, systems and methods consistent with an embodiment of this invention terminate the first call, which enables asynchronous message communication between the source and destination processors. The destination processor 1200 sends the price request 1800 to the pricing engine 1100. When the destination processor 1200 receives the price (also referred to herein as price result) 1850, the destination processor 1200 calls with the price result 1910. By calling with the price result, the destination processor 1200 establishes a second call 1900. This second call 1900 is terminated (or closed) by the source processor 1300 when the source processor 1300 sends a temporary (or predetermined) response 1950, such as a message with a "0" value. The source processor 1300 then sends the price result 1550 to the pricing adaptor 1400.

Figure 2:
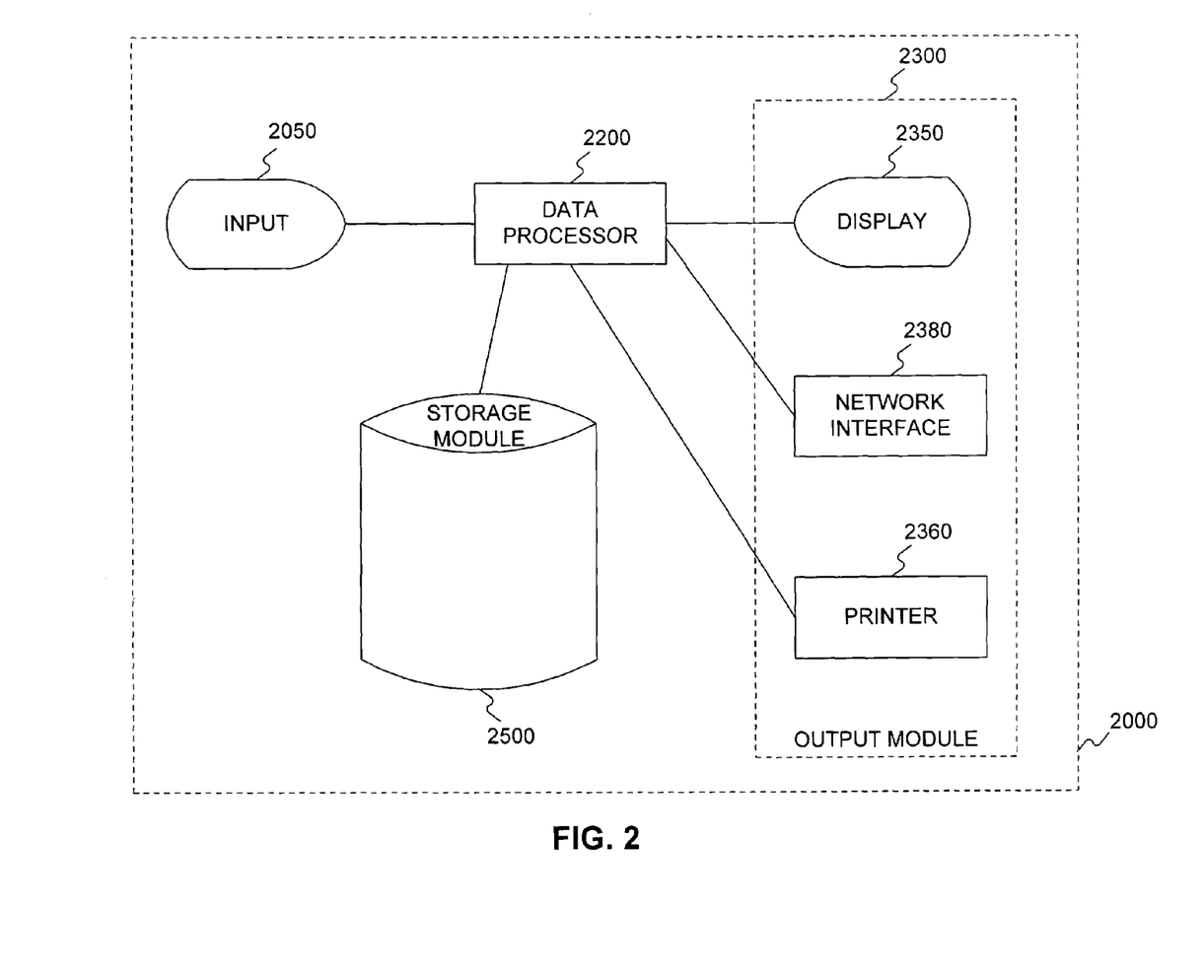
FIG. 2 is an exemplary processor consistent with the systems and methods of the present invention.

FIG. 2 shows a general block diagram of an exemplary processor in which the systems and methods consistent with the present invention may be implemented. The exemplary processor 2000 may be included in the pricing adaptor 1400, source processor 1300, destination processor 1200, and/or pricing engine 1100 (see FIG. 1A). The source processor 1300 may be implemented as a computer 2000 that includes an input module 2050, a data processor 2200, a storage module 2500, and an output module 2300.

The output module 2300 includes a display 2350, a printer 2360, and a network interface 2380. The network interface 2380 enables the computer 2000 to communicate through the communication channels 1151-1153.

The input module 2050 of FIG. 2 may be implemented with a variety of devices to receive a user's input and/or provide the input to the data processor 2200. Some of these devices (not shown) may include, for example, a network interface card, a modem, a keyboard, a mouse, and an input storage device.

Although FIG. 2 illustrates only a single data processor 2200, computer 2000 may alternatively include a set of data processors. The data processor 2200 may also include, for example, one or more of the following: one or more central processing units, a co-processor, memory, registers, and other data processing devices and systems as appropriate.

The storage module 2500 may be embodied with a variety of components or subsystems capable of providing storage including, for example, a hard drive, an optical drive, a general-purpose storage device, a removable storage device, and/or memory. Further, although storage module 2500 is illustrated in FIG. 2 as being separate or independent from data processor 2200, the storage module 2500 and data processor 2200 may be implemented as part of a single platform or system.

In one embodiment, the source processor 1300 includes a processor, such as computer 2000, that processes the pricing request from the pricing adapter 1400 using a synchronous messaging mechanism, such as the Simple Object Access Protocol (SOAP). SOAP is commercially available, and described in Simple Object Access Protocol (SOAP) 1.1 World Wide Web Consortium (W3C), 2000, which is incorporated by reference herein in its entirety. Like the source processor 1300, the destination processor 1200 may also include one or more processors, such as computer 2000, and a synchronous messaging mechanism (e.g., SOAP).

Figure 3:
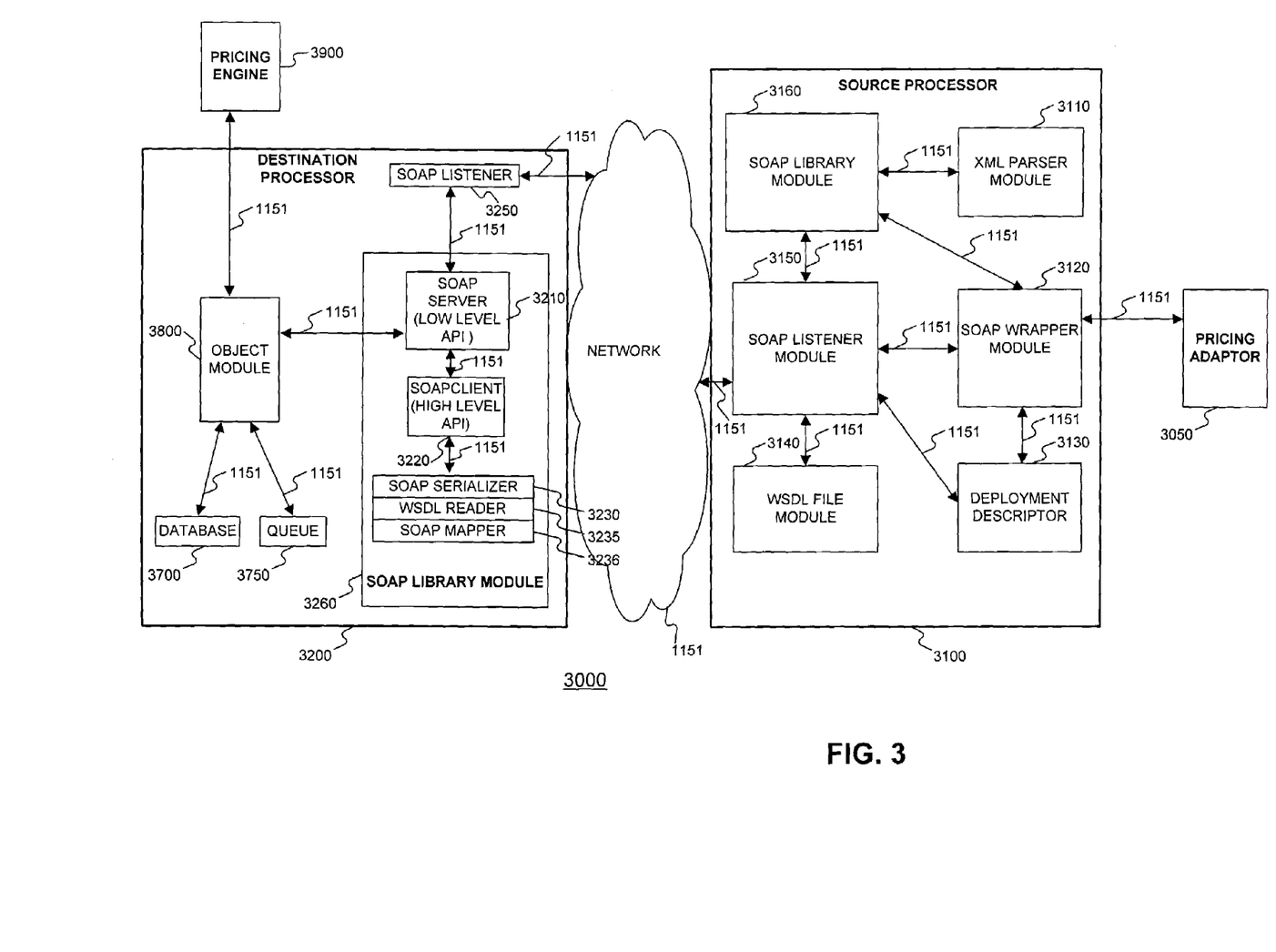
FIG. 3 illustrates another exemplary system environment consistent with the systems and methods of the present invention.

FIG. 3 depicts an exemplary system 3000 for providing asynchronous messaging through a synchronous communication mechanism, such as SOAP. FIG. 3 includes a pricing adapter 3050, a source processor 3100, a destination processor 3200, a pricing engine 3900, and communication channels (network) 1151.

The pricing adaptor 3050 is implemented as described above with respect to FIG. 1A. In one embodiment, the pricing adaptor 3050 also interfaces with a service application that requests price information, forms a price request in XML format, and sends the XML formatted price request to the source processor 3100. XML is well known by those of ordinary skill and commercially available from various vendors. Although XML is described herein, XML is just exemplary and is in no way limiting since other approaches can be used instead.

The source processor 3100 includes a SOAP wrapper module 3120 that receives an XML message with the price request and wraps (or encapsulates) the XML message in a SOAP message. The SOAP wrapper module 3120 also assigns a unique identifier to the price request, and assigns a time out value to that price request. The SOAP wrapper module 3120 may also suppress any vendor specific SOAP features or capabilities, which are not supported by standard SOAP. For example, class "org.apache.soap.rpc.Response" is an Apache implementation class that is used to store values returned by the SOAP call. The SOAP Wrapper class hides that implementation class (unique to Apache) and thus provides a common, generic API (application programming interface) to upper level applications.

Moreover, the source processor 3100 may include a SOAP library module 3160 capable of establishing a call to another processor, such as the destination processor 3200. The call may be in the form of a SOAP message that uses RPC, which is directly supported by SOAP, for messaging. The SOAP library module 3160 may also receive the price request from the SOAP wrapper module 3120.

The source processor 3100 may also include an XML parser module 3110 that reads and writes XML messages, a deployment descriptor module 3130 that configures the source processor 3100 to provide asynchronous messaging, and a WSDL file module 3140 that identifies any procedures that maybe called by other processors (or applications). Furthermore, the source processor 3100 may include a SOAP listener module 3150 that listensfor the message address of the source processor 3100, receives messages, and sends responses through network 1151.

The destination processor 3200 includes a SOAP library module 3260, a SOAP listener module 3250, and an object module 3800.

The SOAP library module 3260 may include one or more processors for determining a SOAP message, such as SOAP RPC, and one or more application programming interfaces. For example, FIG. 3 depicts a low level API SOAP server 3210 that dispatches a price request through the object module 3800 and a high level API SOAP client 3220 that is invoked by the object module 3800 to establish a SOAP RPC call with the source processor 3100, so that the price result can be sent to the source processor 3100.

In the embodiment depicted in FIG. 3, the destination processor also includes a SOAP serializer 3230, a WSDL reader 3235, and a SOAP mapper 3236. The SOAP serializer 3230 converts programming language data types to XML tags and vice versa. The WSDL reader 3235 parses the WSDL file provided by a SOAP service and extracts the detailed interface information used to invoke the SOAP service. The SOAP mapper 3236 maps complex data types to and from XML tags.

The object module 3800 includes a threading model for establishing connections between processors (and/or processes), a context module for defining the run-time (or execution environment), a security module, an asynchronous object execution module for executing modules on the destination processor 3200, and a reference module for linking to an object on an out-of-process server. In one embodiment, the object module 3800 is implemented using the COM+ component module, which is known and commercially available. When COM+ is used, other features such a registration database for storing metadata may be included in the object module 3800. Although FIG. 3 depicts only a single object module 3800, one of ordinary skill in the art would recognize that object module 3800 may include a plurality of modules.

The destination processor 3200 may also include a database 3700 and a message queue module 3750. The database 3700 may include storage and/or memory for storing messaging, such as price requests and corresponding responses. The message queue module 3750 enables an application to post a message and other applications to subscribe to any message postings. When a message is posted to the message queue module 3750, the arrival of the message triggers any subscribing applications to process the received message.

The pricing engine 3900 is implemented as described above with respect to FIG. 1. In one embodiment, the pricing engine 3900 receives price requests for one or more corresponding residential properties. Each price request may include the street address for the property. The pricing engine 3900 processes the request and then determines price result (or a price estimate) for the residential property contained within the price request. The pricing engine 3900 may then provide the price result in XML form, which is received by the destination processor 3200 and reformatted into a SOAP message request.

Figure 4:
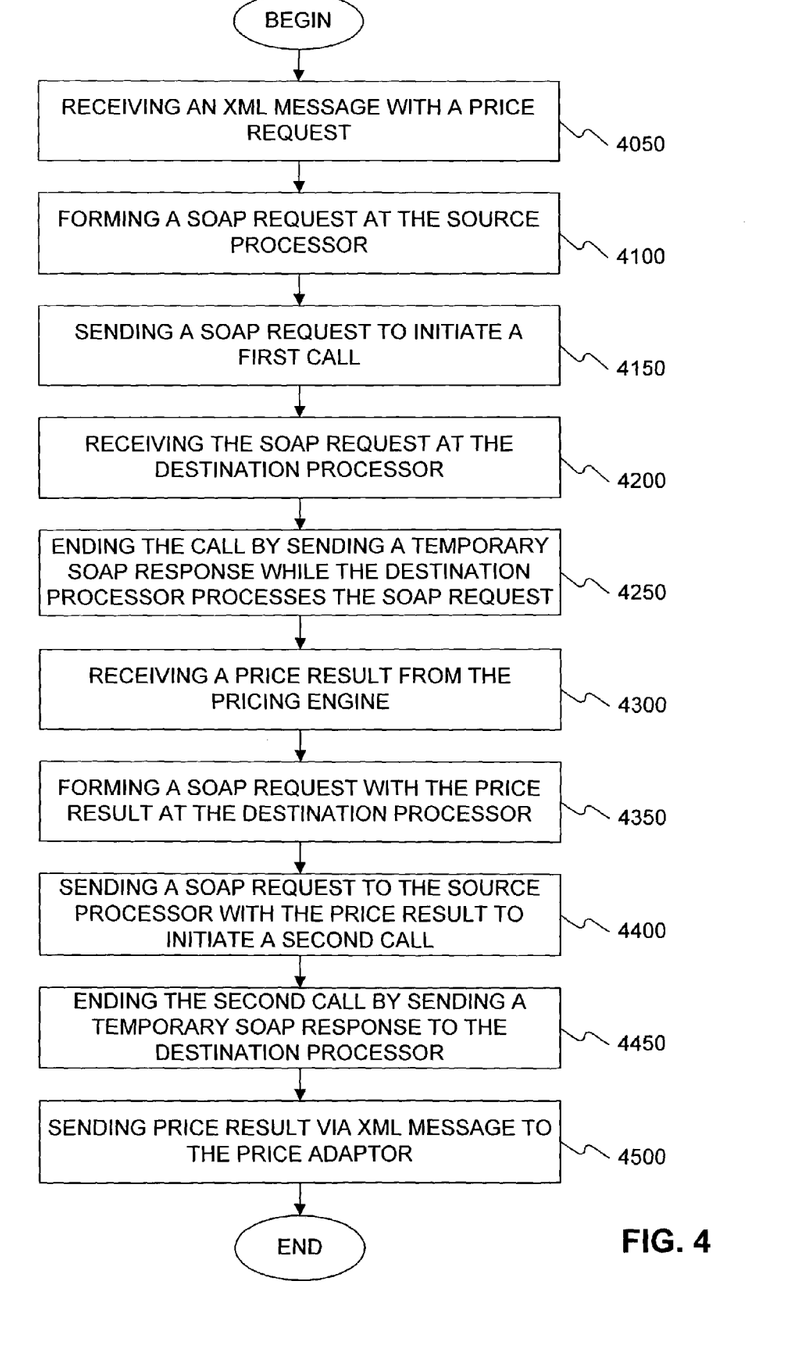
FIG. 4 is an exemplary flowchart for providing asynchronous messaging consistent with the systems and methods of the present invention.

FIG. 4 depicts an exemplary flow chart consistent with one embodiment of the present invention. Referring to FIGS. 3 and 4, the source processor 3100 receives from the pricing adaptor 3050 an XML message with a price request (step 4050); forms a SOAP request (step 4100); and sends the SOAP request to the destination processor 3200 (step 4150) to initiate a first call. The destination processor 3200 receives the SOAP request (step 4200); ends the first call with the source processor 3100 by sending a temporary response (step 4250); and forwards the SOAP request (at least the price request contained therein) to the pricing engine 3900, which determines a price result. The destination processor 3200 then receives the price result from the pricing engine (step 4300); forms a SOAP request with the price result (step 4350); and makes a second call by sending the SOAP request to the source processor 3100 (step 4400). The source processor ends the second call by sending a temporary SOAP response (step 4450). The source processor 3100 sends the price result to the pricing adaptor 3050, where the price result is forwarded to a service application (step 4500). The following description provides additional details for each of the steps 4050-4500.

To begin, the pricing adaptor 3050 constructs an XML message containing the details of the price request. The price request may originate from a service application, such as a web server that provides pricing information to Internet users or to legacy (or mainframe) applications. The source processor 3100 may then receive the price request (step 4050).

In one embodiment, the source processor 3100 includes a SOAP wrapper module 3120 that receives the XML message containing the price request (step 4050). The SOAP wrapper module 3120 may then form a SOAP request from the XML message (step 4100). The SOAP wrapper module 3120 may also add to the SOAP request a unique request identification (ID) and a timeout value. In one embodiment, the request ID is used to keep track of the original price request from the service application and its corresponding SOAP request(s). The request ID thus enables the source processor 3100 to match up the price result (from the pricing engine 3900) with its originating SOAP request(s). When multiple price requests are made by the source processor 3100, the SOAP wrapper module 3120 assigns an ID to each price request. The timeout value may be an upper time limit. After the timeout value is reached, the price adaptor 3050 and/or the source processor 3100 will no longer wait for a response (i.e., a price result) from the pricing engine 3900 and/or destination processor 3200. When a timeout limit is reached for a price request, the source processor 3100 terminates any processes associated with that price request, such as freeing the request ID so that another SOAP request can use the ID.

Moreover, as noted above, the SOAP wrapper module 3120 may hide (or suppress) any vendor unique features of SOAP. For example, the source processor 3100 may implement a vendor-specific version of the SOAP protocol, such as Apache SOAP. In that case, the SOAP wrapper module 3120 would suppress that unique vendor feature, so that the destination processor 3200 can operate using any other vendor's version of SOAP.

The SOAP wrapper module 3120 then sends the SOAP request to the SOAP library module 3160. The SOAP library module 3160 then sends out the SOAP request with three parameters: price request information, request ID, and timeout value (step 4150). The SOAP request is a synchronous remote procedure call (RPC) that remains open until a response is received. As such, the source processor 3100 sends the SOAP request to initiate a first call to the destination processor 3200. The first call remains open until a SOAP response is received. In one embodiment, the SOAP request may include any information that enables the pricing engine 3900 to determine a price, such as a description of a property for which price information is requested, street address, number of rooms, and/or number of bedrooms.

At the destination processor 3200, the SOAP request is received (step 4200). The connection associated with the first call remains open until a response is received. This prevents the connection, such as an HTTP connection (or port), from being used by another call.

In one embodiment, the destination processor 3200 may implement a SOAP server with a different implementation, i.e., a different vendor's version of SOAP. As noted above, the SOAP wrapper module 3120 may suppress any vendor-specific features of SOAP, which enables the destination processor 3200 to implement another vendor's version of SOAP. For example, the destination processor 3200 may include a SOAP listener module 3250 that listens for SOAP requests destined for that destination processor using a vendor-specific version of SOAP, such as Microsoft (MS) SOAP 2.0, while the source processor 3100 may use another vendor's version of SOAP, such as Apache SOAP.

The SOAP listener module 3250 at the destination processor 3200 may also dispatch (or send) the received SOAP request to the SOAP server module 3210 and the object module(s) 3800. The responsible object module 3800 saves the SOAP request to a database 3700 and posts the SOAP request in a message queue 3750. Once posted in the message queue 3750, the object module 3800 may trigger and thus process the SOAP request. In one embodiment, the object module 3800, which processes the SOAP request, may break up the request into multiple, smaller SOAP requests to facilitate processing by the pricing engine 3900.

When the SOAP request is saved by the database 3700 and/or put in queue 3750, the destination processor 3200 (or SOAP server 3210) responds to the source processor's SOAP request with a temporary response (step 4250). In one embodiment, as soon as the SOAP request is successfully saved to the database 3700 and/or put in the queue 3750, the SOAP server module 3210 at the destination processor 3200 returns a temporary value of "0". The temporary value is essentially a fake (or pseudo) SOAP response to the corresponding SOAP request. When the source processor 3100 receives the temporary value contained in the SOAP response, the source processor 3100 terminates the first call corresponding to SOAP request (or response), releasing the connection for other processors.

The destination processor 3200 continues to process the pricing request. The object module 3800 then sends the price request (at least the pricing information in the original SOAP Request) to the pricing engine 3900 for processing. As noted above, when the price request includes information for more than one property, the object module 3800 parses the price request into multiple individual price requests with each request corresponding to a separate property.

The pricing engine 3900 may then calculate the price and send the price to the object module 3800. When multiple home information are included in the price request, the object module 3800 may then assemble the prices for all of the individually priced homes and then construct a single message, such as an XML message, with the price information for all of the properties.

Before sending the price result, the SOAP client 3220 may look up a location (or address) for the source processor 3100. For example, the WSDL (Web Services Description Language) reader 3235 may read a WSDL file that describes an interface, such as an API, at the source processor 3100. The WSDL then provides the location (or name) of the API to SOAP client module 3220, so that the SOAP client module 3220 may make a SOAP request (or procedure call) to that API.

The destination processor 3200 forms a SOAP message with the price result, the request ID (i.e., the original request ID created by the SOAP wrapper module 3120 in step 4100 above), and the name of the API at the source processor 3100 (step 4350). The SOAP message is sent to the source processor 3100 to initiate a second call (step 4400). In one embodiment, the destination processor 3200 may not provide a price but instead request additional information before calculating a price result. When that is the case, the pricing adaptor 3050 may obtain any additional information from a database (not shown) and then make another SOAP call to the destination processor 3200 (also referred to as a ping-pong message) with the additional requested information using the same request ID.

The SOAP listener module 3150 at the source processor 3100 receives the SOAP request received from the destination processor 3200; parses the SOAP request (e.g., pulls out the price result information and leaves other SOAP fields); and then sends the request to the SOAP wrapper module 3120.

When the price is received by the SOAP wrapper module 3120, a return value of "0" is returned to the SOAP server module 3260 at the destination processor 3200 (step 4450). The SOAP wrapper module 3120 at the source processor 3100 may then forward the price result to the pricing adaptor 3050, which passes the price result to a service application (step 4500).

In one embodiment, to invoke asynchronous messaging using SOAP RPC, a SOAP Interface API method name is used. For example, when sending pricing requests from the pricing adaptor 1400 to the pricing engine 1100, the SOAP Interface API method name may include "CalculatePrice" with parameters such as "requested", "timeout," and "inputData." The method name "CalculatePrice" may be called by any processor that seeks a price (i.e., makes a price request). The parameter "requestId" is generated by the source processor 1300 and sent to the pricing engine 1100. The pricing engine returns the "requestId" parameter back such that the source processor 1300 can match the "requested" with the original price request. The parameter "timeout" is a value set by the source processor 1300 to indicate the maximum amount of time before the price request expires. As noted above, the source processor 1300 times out after the timeout period and terminates any other corresponding processes. The "inputData" string is an XML string, and may include information required by the pricing engine to calculate price (e.g., a property description).

The destination processor 3200 may also invoke an API to provide asynchronous messaging using SOAP RPC. For example, when providing the price result to the source processor 3100, the destination processor 3200 invokes an API named "invokeServices", which is described in WSDL file 3140. The API "invokeServices", includes three parameters: "requestId", "messageName", and "inputData". The parameter "requestId" is similar to the above "requestId." The parameter "messageName" corresponds to the original price request made during the first SOAP call (or request). The "messageName" also identifies whether the message is a final price result or an intermediate result, such as a ping-pong message requesting additional information. The parameter "inputData" string is an XML string with, for example, the price result.

Figure 5:
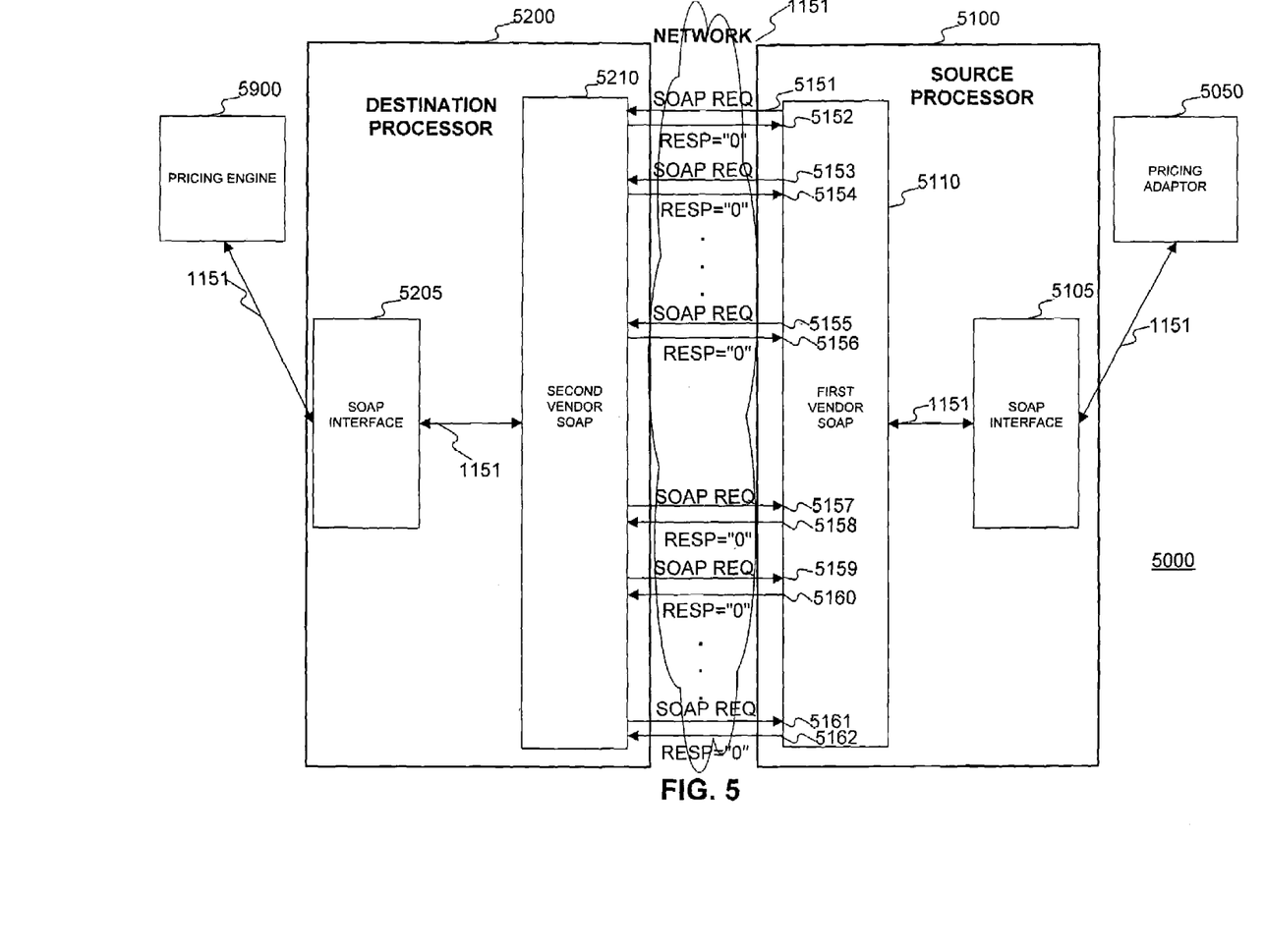
FIG. 5 is another exemplary system environment with multiple simultaneous calls consistent with the systems and methods of the present invention.

FIG. 5 depicts a system consistent with an embodiment, wherein multiple calls are depicted. Referring to FIG. 5, the system 5000 includes a pricing adaptor 5050, a source processor 5100, a communication channel (network) 1151, a destination processor 5200, and a pricing engine 5900. The source processor 5100 further includes a SOAP interface 5105 and a SOAP RPC messaging mechanism provided by a first vendor 5110. The destination processor 5200 includes a SOAP interface 5205 and a SOAP RPC messaging mechanism provided by a second vendor 5210. FIG. 5 also depicts a plurality of SOAP request (REQ) and SOAP responses (RESP) 5151-5162. The SOAP requests and responses may be made through the network 1151.

The source and destination processors 5100, 5200 are similar to the source and destination processor described above with respect to FIG. 3. FIG. 5 depicts that the source processor 5100 includes a SOAP interface 5105. The SOAP interface 5105 may be called by other processors. In one embodiment, the SOAP interface may be called through an API, such as the "Calculate Price" API described above. On the other hand, the destination processor 5200 includes a SOAP interface 5205, which is functionally similar to the interface 5105. SOAP Interface 5205 may also be callable through an API, such as the "invoke Services" described above. The different APIs permit each interface to operate using a different vendor's version of SOAP, eliminating the need for the same vendor specific version of SOAP to be implemented at the source and destination processors.

Referring to FIGS. 4 and 5, the source processor 5100 receives an XML message with a price request (step 4050); forms a SOAP request (step 4100); and sends the SOAP request 5151 to the destination processor 5200 (step 4150). There, the destination processor 5200 receives the SOAP request 5151 (step 4200) and ends the call by sending a SOAP response 5152, such as a "0" (or null) response, to the source processor 5100 (step 4250). FIG. 5 shows that the pricing adaptor 5050 may make multiple price requests that result in multiple SOAP requests and responses 5151-5162. Systems and methods consistent with an embodiment of the present invention end a call by sending a temporary SOAP response even though the destination processor 5200 has not determined a price result for the source processor 5100. As such, the connection occupied by the call (e.g., 5151, 5152) is open and available for other calls. In the embodiment depicted in FIG. 5, multiple calls for prices can be processed without needlessly occupying the network 1151 and/or HTTP connections (or ports) on the source or destination processors 5100, 5200.

As described above with respect to FIG. 4, the destination processor 5200 forwards the price request to the pricing engine 5900, which determines a price result. The destination processor 5200 then receives the price result from the pricing engine 5900 (step 4300); forms a SOAP request with the price result (step 4350); and then makes a second call by sending the SOAP request 5157 to the source processor 5100 (step 4400). The source processor 5100 ends that call 4450 by sending a temporary response 5158 (step 4450). Next, the source processor 5100 sends the price result to the pricing adaptor 5050 (step 4500). The other price requests that were provided by SOAP requests 5153, 5155 are also processed to determine price results.

Although the description above refers to MS SOAP and Apache SOAP, a skilled artisan would recognize that other types of SOAP may be implemented instead. For example, one or more sides of the SOAP interface may be compatible with any other version of SOAP including Apache, MS, or LINUX versions.

The systems and methods disclosed herein may be embodied in various forms including, for example, a data processor, such as the computer 2000 that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be well known and available to those of ordinary skill in the computer software arts. Examples of program instructions include machine code, such as produced by a compiler, and files containing a high level code that can be executed by the computer using an interpreter.

Furthermore, although reference is made herein to prices in its broadest sense systems and methods consistent with the present invention may provide messaging for any type of information.

Turning to the nomenclature of the specification, the detailed description above is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of the above discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files, etc. However, these and similar terms should be associated with appropriate physical quantities for computer operations. These terms are merely conventional labels applied to physical quantities that exist within and during computer operation.

What is claimed is:

1. A method for providing communication between a source processor and a destination processor comprising the steps of:

receiving, at the source processor, an information request using a first message format;

encapsulating the information request into a second message format;

making, at the source processor, a first synchronous call to the destination processor, the first synchronous call including the information request and establishing a connection between the source processor and the destination processor;

ending the first synchronous call by sending a temporary response with a predetermined value to the source processor while the destination processor determines an information response, wherein the temporary response terminates the connection between the source processor and the destination processor and allows use of the connection for one or more additional calls;

generating the information response using the first message format;

encapsulating the information response into the second message format;

making, at the destination processor, a second synchronous call to the source processor, the second synchronous call including the information response; and ending the second synchronous call to terminate communication between the destination processor and the source processor.

2. The method of claim 1, wherein said receiving further comprises the step of:

receiving the information request, such that the information request includes a request for a price on a residential property.

3. The method of claim 1, wherein said receiving the information request further comprises the step of:

receiving the information request from an application programming interface.

4. The method of claim 1, wherein the second message format includes Simple Object Access Protocol (SOAP).

5. The method of claim 4, wherein said sending the message further comprises the step of:

defining the Simple Object Access Protocol (SOAP) to include a Remote Procedure Call protocol.

6. The method of claim 1, further comprising the step of:

determining the information response based on the information request.

7. The method of claim 1, further comprising the step of:

defining the information response to include a price result.

8. The method of claim 1, wherein making the second synchronous call further comprises the step of:

sending the information response in a message.

9. The method of claim 1, further comprising the steps of:

making the first synchronous call based on a first version of a Simple Object Access Protocol (SOAP); and making the second synchronous call based on a second version of the Simple Object Access Protocol (SOAP), wherein the first version and the second version correspond to two different vendors of the Simple Object Access Protocol (SOAP).

10. A system for providing communication between a source processor and a destination processor comprising:
- means for receiving, at the source processor, an information request using a first message format;
- means for encapsulating the information request into a second message format;
- means for making, at the source processor, a first synchronous call to the destination processor, the first synchronous call including the information request and establishing a connection between the source processor and the destination processor;
- means for ending the first synchronous call by sending a temporary response with a predetermined value to the source processor while the destination processor determines an information response, wherein the temporary response terminates the connection between the source processor and the destination processor and allows use of the connection for one or more additional calls;
- means for generating the information response using the first message format;
- means for encapsulating the information response into the second message format;
- means for making, at the destination processor, a second synchronous call to the source processor, the second synchronous call including the information response; and
- means for ending the second synchronous call to terminate communication between the destination processor and the source processor.

11. The system of claim 10, wherein said means for receiving further comprises:
- means for receiving the information request, such that the information request includes a request for a price on a residential property.

12. The system of claim 10, wherein said means for receiving the information request further comprises:
- means for receiving the information request from an application programming interface.

13. The system of claim 10, wherein the second message format includes a Simple Object Access Protocol (SOAP).

14. The system of claim 13, wherein said means for sending the message further comprises:
- means for defining the Simple Object Access Protocol (SOAP) to include a Remote Procedure Call protocol.

15. The system of claim 10, further comprising the step of:
- means for determining the information response based on the information request.

16. The system of claim 10, further comprising:
- means for defining the information response to include a price result.

17. The system of claim 10, wherein said means for making the second synchronous call further comprises:
- means for sending the information response in a message.

18. The system of claim 10, further comprising:
- means for making the first synchronous call based on a first version of a Simple Object Access Protocol (SOAP); and
- means for making the second synchronous call based on a second version of the Simple Object Access Protocol (SOAP), wherein the first version and the second version correspond to two different vendors of the Simple Object Access Protocol (SOAP).

19. A system for providing communication between a source processor and a destination processor, said system comprising:
- at least one memory comprising:
  - code that receives, at the source processor, an information request using a first message format;
  - code that encapsulates the information request into a second message format;
  - code that makes, at the source processor, a first synchronous call to the destination processor, the first synchronous call including the information request and establishing a connection between the source processor and the destination processor;
  - code that ends, at the source processor, the first synchronous call by sending a temporary response with a predetermined value to the source processor while the destination processor determines an information response, wherein the temporary response terminates the connection between the source processor and the destination processor and allows use of the connection for one or more additional calls;
  - code that generates the information response using the first message format;
  - code that encapsulates the information response into the second message format;
  - code that makes, at the destination processor, a second synchronous call to the source processor, the second synchronous call including the information response; and
  - code that ends, at the destination processor, the second synchronous call to terminate communication between the destination processor and the source processor.

20. A computer program product for use with a computer system, the computer program product comprising:
- a computer useable medium, having program code embodied in the medium for causing the computer system to provide communication between a source processor and a destination processor, said code comprising:
  - code that receives, at the source processor, an information request using a first message format;
  - code that encapsulates the information request into a second message format;
  - code that makes, at the source processor, a first synchronous call to the destination processor, the first synchronous call including the information request and establishing a connection between the source processor and the destination processor;
  - code that ends, at the source processor, the first synchronous call by sending a temporary response with a predetermined value to the source processor while the destination processor determines an information response, wherein the temporary response terminates the connection between the source processor and the destination processor and allows use of the connection for one or more additional calls;
  - code that generates the information response using the first message format;
  - code that encapsulates the information response into the second message format;
  - code that makes, at the destination processor, a second synchronous call to the source processor, the second synchronous call including the information response; and code that ends, at the destination processor, the second synchronous call to terminate communication between the destination processor and the source processor.

21. A method for providing communication between a source processor and a destination processor comprising the steps of:
receiving, at the source processor, an information request using a first message format;
encapsulating the information request into a second message format;
making, at the source processor, a first synchronous call to the destination processor with the information request, the first synchronous call establishing a connection between the source processor and the destination processor;
ending the first synchronous call by sending a temporary response with a predetermined value to the source processor after receiving the information request but before an information response is determined, wherein the temporary response terminates the connection between the source processor and the destination processor;
determining the information response;
generating the information response using the first message format;
encapsulating the information response into the second message format;
making, at the destination processor, a second synchronous call to the source processor with the information response; and
ending the second synchronous call to terminate communication between the destination processor and the source processor.

22. A method for providing communication between a source processor and a destination processor comprising the steps of:
receiving, at the source processor, an information request using a first message format;
encapsulating the information request into a second message format;
making, at the source processor, a first synchronous call to the destination processor with the information request, the first synchronous call establishing a connection between the source processor and the destination processor;
ending, at the destination processor, the first synchronous call, after receiving the information request, by sending a temporary response with a predetermined value to terminate the connection between the source processor and the destination processor;
determining an information response;
generating the information response using the first message format;
encapsulating the information response into the second message format;
making, at the destination processor, a second synchronous call to the source processor with the information response; and
receiving, at the source processor, the information response.

23. A method for providing communication comprising the steps of:
receiving an information request;
making a first synchronous call to a destination processor with the information request using a first message format, the first synchronous call establishing a connection between the destination processor and a source processor;
encapsulating the information request into a second message format;
ending the first synchronous call after receiving the information request but before an information response is determined by sending a temporary response with a predetermined value, wherein the temporary response terminates the connection;
generating the information response using the first message format;
encapsulating the information response into the second message format;
receiving a second synchronous call with the information response that is based on the information request; and
ending the second synchronous call to terminate communication.

24. A system for providing communication between a source processor and a destination processor comprising:
means for receiving, at the source processor, an information request using a first message format;
means for encapsulating, at the source processor, the information request into a second message format;
means for making, at the source processor, a first synchronous call to the destination processor with the information request, the first synchronous call establishing a connection between the source processor and the destination processor;
means for ending the first synchronous call after receiving the information request but before an information response is determined by sending a temporary response with a predetermined value, wherein the temporary response terminates the connection;
means for determining the information response;
means for generating the information response using the first message format;
means for encapsulating the information response into the second message format;
means for making, at the destination processor, a second synchronous call to the source processor with the information response; and
means for ending the second synchronous call to terminate communication between the destination processor and the source processor.

25. A system for providing communication between a source processor and a destination processor comprising:
means for receiving, at the source processor, an information request using a first message format;
means for encapsulating the information request into a second message format;
means for making, at the source processor, a first synchronous call to the destination processor with the information request, the first synchronous call establishing a connection between the source processor and the destination processor;
means for ending, at the destination processor, the first synchronous call after receiving the information request by sending a temporary response with a predetermined value, the temporary response terminating the connection;
means for determining an information response;
means for generating the information response using the first message format;
means for encapsulating the information response into the second message format;

means for making, at the destination processor, a second synchronous call to the source processor with the information response; and means for receiving, at the source processor, the information response.

26. A system for providing communication comprising:

means for receiving an information request using a first message format;

means for encapsulating the information request into a second message format;

means for making a first synchronous call to the destination processor with the information request, the first synchronous call establishing a connection between the destination processor and the source processor;

means for ending the first synchronous call after receiving the information request but before an information response is determined by sending a temporary response including a predetermined value, the temporary response terminating the connection;

means for generating the information response using the first message format;

means for encapsulating the information response into the second message format;

means for receiving a second synchronous call with the information response that is based on the information request; and means for ending the second synchronous call to terminate communication.

27. A system for providing communication between a source processor and a destination processor, said system comprising:

at least one memory comprising:

code that receives, at the source processor, an information request using a first message format;

code that encapsulates, at the source processor, the information request into a second message format;

code that makes, at the source processor, a first synchronous call to the destination processor with the information request, the first synchronous call establishing a connection between the destination processor and the source processor;

code that ends the first synchronous call after receiving the information request but before an information response is determined by sending a temporary response including a predetermined value to terminate the connection;

code that determines the information response;

code that generates the information response using the first message format;

code that encapsulates the information response into the second message format;

code that makes, at the destination processor, a second synchronous call to the source processor with the information response; and code that ends the second synchronous call to terminate the communication between the destination processor and the source processor; and at least one data processor that executes said code.

28. A system for providing communication between a source processor and a destination processor, said system comprising:

at least one memory comprising:

code that receives, at the source processor, an information request using a first message format;

code that encapsulates, at the source processor, the information request into a second message format;

code that makes, at the source processor, a first synchronous call to the destination processor with the information request, the first synchronous call establishing a connection between the source processor and the destination processor;

code that ends, at the destination processor, the first synchronous call after receiving the information request by sending a temporary response with a predetermined value, wherein the temporary response terminates the connection;

code that determines an information response;

code that generates the information response using the first message format;

code that encapsulates the information response into the second message format;

code that makes, at the destination processor, a second synchronous call to the source processor with the information response; and code that receives, at the source processor, the information response; and at least one data processor that executes said code.

29. A system for providing communication, said system comprising:

at least one memory comprising:

code that receives an information request using a first message format;

code that encapsulates the information request into a second message format;

code that makes a first synchronous call to a destination processor with the information request, the first synchronous call establishing a connection between the destination processor and a source processor;

code that ends the first synchronous call after receiving the information request but before an information response is determined by sending a temporary response with a predetermined value, wherein the temporary response terminates the connection;

code that generates the information response using the first message format;

code that encapsulates the information response into the second message format;

code that receives a second synchronous call with the information response that is based on the information request; and code that ends the second synchronous call to terminate communication; and at least one data processor that executes said code.

30. A computer program product for use with a computer system, the computer program product comprising:

a computer useable medium, having program code embodied in the medium for causing the computer system to provide communication between a source processor and a destination processor, said code comprising:

code that receives, at the source processor, an information request using a first message format;

code that encapsulates the information request into a second message format;

code that makes, at the source processor, a first synchronous call to the destination processor with the information request, the first synchronous call establishing a connection between the source processor and the destination processor;

code that ends the first synchronous call after receiving the information request but before an information response is determined by sending a temporary response with a predetermined value, wherein the temporary response terminates the connection;

code that determines the information response;

code that generates the information response using the first message format;

code that encapsulates the information response into the second message format;

code that makes, at the destination processor, a second synchronous call to the source processor with the information response; and code that ends the second synchronous call to terminate communication between the destination processor and the source processor.

31. A computer program product for use with a computer system, the computer program product comprising:

a computer useable medium, having program code embodied in the medium for causing the computer system to provide communication between a source processor and a destination processor, said code comprising:

code that receives, at the source processor, an information request using a first message format;

code that encapsulates the information request into a second message format;

code that makes, at the source processor, a first synchronous call to the destination processor with the information request, the first synchronous call establishing a connection between the source processor and the destination processor;

code that ends, at the destination processor, the first synchronous call after receiving the information request by sending a temporary response with a predetermined value, wherein the temporary response terminates the connection;

code that determines an information response;

code that generates the information response using the first message format;

code that encapsulates the information response into the second message format;

code that makes, at the destination processor, a second synchronous call to the source processor with the information response; and code that receives, at the source processor, the information response.

32. A computer program product for use with a computer system, the computer program product comprising:

a computer useable medium, having program code embodied in the medium for causing the computer system to provide communication, said code comprising:

code that receives an information request using a first message format;

code that encapsulates the information request into a second message format;

code that makes a first synchronous call to a destination processor with the information request, the first synchronous call establishing a connection between the destination processor and a source processor;

code that ends the first synchronous call after receiving the information request but before an information response is determined by sending a temporary response with a predetermined value, the temporary response terminating the connection;

code that generates the information response using the first message format;

code that encapsulates the information response into the second message format;

code that receives a second synchronous call with the information response that is based on the information request; and code that ends the second synchronous call to terminate communication.

* * * * *